United States Patent
Macken et al.

(10) Patent No.: US 11,518,190 B2
(45) Date of Patent: Dec. 6, 2022

(54) HEAVY-DUTY CONNECTIONS E.G. FOR AXLE/SUSPENSION SYSTEMS

(71) Applicant: Hendrickson United Kingdom Ltd, Wellingborough (GB)

(72) Inventors: Shaun Macken, Wellingborough (GB); Sathya Babu, Wellingborough (GB); Nathan Wilson, Wellingborough (GB)

(73) Assignee: Hendrickson United Kingdom Ltd

( * ) Notice: Subject to any disclaimer, the term of this patent is extended or adjusted under 35 U.S.C. 154(b) by 0 days.

(21) Appl. No.: 16/757,488

(22) PCT Filed: Oct. 23, 2018

(86) PCT No.: PCT/EP2018/079042
§ 371 (c)(1),
(2) Date: Apr. 20, 2020

(87) PCT Pub. No.: WO2019/081512
PCT Pub. Date: May 2, 2019

(65) Prior Publication Data
US 2020/0247183 A1    Aug. 6, 2020

(30) Foreign Application Priority Data
Oct. 23, 2017 (GB) ..................................... 1717371

(51) Int. Cl.
*B60B 35/00* (2006.01)
*B21D 39/04* (2006.01)
(Continued)

(52) U.S. Cl.
CPC ............ *B60B 35/007* (2013.01); *B21D 39/04* (2013.01); *B60B 35/04* (2013.01); *B60G 9/003* (2013.01);
(Continued)

(58) Field of Classification Search
CPC ...... B60G 2206/8209; B60G 2204/148; B60G 2204/4306; B60G 9/003; B60G 2200/31;
(Continued)

(56) References Cited

U.S. PATENT DOCUMENTS

| 587,695 A | 8/1897 | Billing et al. |
| 1,329,479 A | 2/1920 | Roger |

(Continued)

FOREIGN PATENT DOCUMENTS

| AU | 2011100101 A4 * | 2/2011 | ............. B60B 27/02 |
| CA | 2910519 C * | 8/2018 | ......... F16D 65/0081 |

(Continued)

*Primary Examiner* — Paul N Dickson
*Assistant Examiner* — Matthew D Lee
(74) *Attorney, Agent, or Firm* — Dureska & Moore, LLC; David P. Dureska; Benjamin J. Chojnacki

(57) ABSTRACT

A vehicle component such as an axle spindle or suspension beam (3) is connected to a tubular vehicle axle (1) by fitting a connector sleeve (2) onto the axle and subjecting the assembly to a crimping operation in which plural depressions (206,2018) are formed by indentation in the connector sleeve and the axle wall at the connection region (11,12) to fix the connector sleeve on the tubular axle. In the described proposals a solid lubricant (4) such as molybdenum disulphide is applied at the connection region between the connector sleeve (2) and axle (1), before crimping. The further vehicle component (3) is then connected to the connector sleeve (2) by welding.

14 Claims, 3 Drawing Sheets

(51) Int. Cl.
*B60B 35/04* (2006.01)
*B60G 9/00* (2006.01)
*F16B 7/00* (2006.01)

(52) U.S. Cl.
CPC .......... *F16B 7/00* (2013.01); *B60B 2310/302* (2013.01); *B60B 2310/314* (2013.01); *B60G 2200/31* (2013.01); *B60G 2204/148* (2013.01); *B60G 2206/80* (2013.01); *B60G 2206/8201* (2013.01); *B60G 2206/8209* (2013.01)

(58) Field of Classification Search
CPC . B60B 35/08; B60B 35/007; B60B 2310/314; B23P 11/005; B21D 39/04; F16B 17/004
See application file for complete search history.

(56) References Cited

U.S. PATENT DOCUMENTS

| | | | |
|---|---|---|---|
| 1,548,990 A | 8/1925 | Garman | |
| 1,703,037 A | 2/1929 | Ferdinand | |
| 1,906,290 A | 5/1933 | Urschel | |
| 3,076,531 A * | 2/1963 | Fisher | F16D 65/22 188/196 R |
| 3,576,938 A | 5/1971 | Capotosto et al. | |
| 3,824,665 A | 7/1974 | Saito | |
| 4,120,083 A * | 10/1978 | Echols | F16L 21/00 285/374 |
| 4,257,155 A * | 3/1981 | Hunter | B21D 39/04 285/382.2 |
| 4,557,526 A * | 12/1985 | Smith | B60B 37/08 280/414.1 |
| 4,627,146 A * | 12/1986 | Ward | B21D 39/04 29/458 |
| 4,779,902 A * | 10/1988 | Lee | F16L 47/00 285/260 |
| 6,015,350 A | 1/2000 | Breese | |
| 6,701,598 B2 | 3/2004 | Chen et al. | |
| 7,066,479 B2 | 6/2006 | Melton | |
| 7,066,491 B2 | 6/2006 | Kittler et al. | |
| 7,237,809 B2 | 7/2007 | Connell | |
| 8,020,272 B2 | 9/2011 | Ghiran et al. | |
| 8,567,821 B1 | 10/2013 | Wagner et al. | |
| 8,702,112 B1 * | 4/2014 | Belleau | B62D 7/20 280/93.51 |
| 9,079,467 B2 | 7/2015 | Westnedge et al. | |
| 9,193,236 B2 | 11/2015 | Westnedge et al. | |
| 9,580,057 B2 * | 2/2017 | Pierce | B60T 17/088 |
| 2007/0000669 A1 | 1/2007 | McKee et al. | |
| 2009/0224503 A1 * | 9/2009 | Richardson | B60B 35/08 280/124.116 |
| 2011/0001350 A1 | 1/2011 | Schmitz et al. | |
| 2011/0219602 A1 * | 9/2011 | Toepker | B60G 21/051 29/428 |
| 2012/0080862 A1 * | 4/2012 | Westnedge | F16D 51/00 280/124.1 |
| 2012/0317787 A1 * | 12/2012 | Ross | B21D 39/04 29/522.1 |
| 2013/0026793 A1 | 1/2013 | Wagner et al. | |
| 2013/0207450 A1 * | 8/2013 | Ebert | B60B 35/14 301/132 |
| 2015/0273964 A1 * | 10/2015 | Westnedge | B60G 9/003 228/136 |
| 2016/0281887 A1 * | 9/2016 | Dobmeier | F16L 13/146 |
| 2018/0087693 A1 * | 3/2018 | Dhanasekaran | F02C 7/222 |
| 2020/0307311 A1 * | 10/2020 | Ebert | B60B 35/16 |

FOREIGN PATENT DOCUMENTS

| | | | |
|---|---|---|---|
| CN | 101574914 | 2/2011 | |
| DE | 29615286 | 11/1996 | |
| EP | 2889402 | 7/2015 | |
| FR | 2157481 | 6/1973 | |
| GB | 1289933 A * | 9/1972 | ......... F16L 13/0236 |
| JP | H0475441 | 3/1992 | |
| JP | 2008056100 | 3/2008 | |
| JP | 2013204696 A * | 10/2013 | |
| WO | 1987005369 | 9/1987 | |
| WO | WO-9201530 A1 * | 2/1992 | ............. B21D 39/04 |
| WO | 2009053491 | 4/2009 | |
| WO | 2012044906 | 4/2012 | |
| WO | WO-2012044906 A2 * | 4/2012 | ............. B60T 1/067 |
| WO | WO-2016081635 A1 * | 5/2016 | ........... B60B 27/001 |
| WO | WO-2017097957 A1 * | 6/2017 | ............. F16F 1/3842 |

* cited by examiner

HEAVY-DUTY CONNECTIONS E.G. FOR AXLE/SUSPENSION SYSTEMS

CROSS-REFERENCE TO RELATED APPLICATIONS

This application claims the benefit of PCT Application Serial No. PCT/EP2018/079042 filed Oct. 23, 2018, which claims the benefit of U.K. Patent Application Serial No. 1717371.7, filed Oct. 23, 2017.

FIELD OF THE INVENTION

This invention has to do with methods for connecting heavy-duty metal components, particularly where a hollow inner component such as an axle tube is to be connected at its outer surface to another component, such as for example a suspension beam or other component, and especially through a sleeve-form outer component. The connected assemblies made using the method are an aspect of our proposals.

BACKGROUND

In WO2012/044802 (corresponding to U.S. Pat. No. 8,454,040 and EP2621737 among others), filed by Hendrickson USA, L.L.C., a method was described for connecting an axle tube to a suspension beam not by direct welding, as is conventional, but through the intermediary of a discrete outer sleeve component fitted around the axle. To make the connection the sleeve component, which desirably is subjected to more plastic deformation than the axle wall, is slid at a close fit over the axle tube and then the assembly is subjected to a crimping or swaging operation to form a set of permanent indentations or depressions simultaneously in both components. Desirably a series or array of such depressions is formed around the axle tube. Formation of the depressions creates a powerful mechanical interlock, while at the same time the greater elastic recovery of the axle tube wall urges it out into permanent forceful engagement biased against the inside of the sleeve at the position of the depressions, giving a rigid joint without play. The associated external suspension component is welded subsequently to the sleeve rather than being welded directly to the axle, so that an axle of relatively thinner wall thickness (and hence lower weight) can be used, while the resulting connection is found to have good strength and rigidity. A similar method was proposed for connection of a beam to a suspension crossbrace (see e.g. U.S. Pat. No. 9,079,467B), and for mounting a brake assembly to an axle.

THE INVENTION

An aim herein is to provide new and useful connection methods of the kind described, and heavy-duty connected assemblies, such as axle/suspension assemblies and sub-assemblies thereof, which can have improved fatigue strength and/or product lifetime. Use in the axle/suspension assemblies of heavy-duty vehicles (trucks, lorries, semitrailers etc.) is a preferred field of application.

In a first aspect, the invention provides a method for connecting an inner metal component to an outer metal component. The inner component has a wall, preferably defining an interior cavity, and in preferred embodiments is a tubular component, especially a cylindrical tubular component. It may be an axle/suspension component, such as for a heavy-duty vehicle. It may be an axle, crossbrace or the like. The outer component is formed with a wall to complement an outer connection surface of the inner component wall, and preferably comprises or consists of a tube or part-tube fitting onto and/or around the outer connection surface of the inner component. The outer component desirably constitutes an intermediate formation through which the inner component is connected to a further component or structure. The further component or structure may be e.g. a suspension component in a vehicle suspension, such as a beam, spring beam, axle seat, brake system, axle spindle or the like e.g. in a heavy-duty vehicle axle/suspension system. However the present invention may be used in other technical areas. In particular, it is envisaged that the connection of the outer component to the inner component by the present method can substitute for a connection of the further component or structure to the inner component by welding, or by means of penetrating fasteners such as bolts etc. While the outer component may be comprised in such other component or structure, we prefer that the outer component is discrete, at least at the time of connecting the outer component to the inner component. This enables use of an outer component of simple form such as a sleeve or part-sleeve which is easy to handle.

In the connection method, the inner and outer components are fitted together and one or more depressions formed in them by indentation, desirably simultaneously, and desirably inwardly directed (so that the outer surface of the outer component is indented and the inner surface of the inner component projects inwardly), each respective depression having a mating engagement between the inner and outer components to connect them together by mechanical interlock. Desirably plural such indentations/depressions are formed, e.g. in an array distributed around the components such as described in the above-mentioned patent documents.

According to the invention, a lubricant is provided between the inner and outer components at a connection region where the depression is formed, so that the lubricant is present between the indented wall portions of the two components. Preferably such lubricant is provided for each or all of the depressions, such as all around a said component. Lubricant may be applied preliminarily to the outer surface of the inner component or to the inner surface of the outer component at the connection region, or to both, depending on the shapes of the components and the consistency and adhesion of the lubricant.

In a further stage of the process, typically a further component or structure is attached to the outer component, and preferably the attachment use welding. The other component or structure may be of any of the types mentioned above.

A second aspect of the invention is a connected assembly of inner and outer components, obtained or obtainable by a method as described, with said one or more depressions and the lubricant present at the interface between the inner and outer components at one or more said depressions, and preferably comprising also a said other structure or component connected to the outer component e.g. by welding.

As mentioned above, it is generally preferred that the outer component has more plastic deformation than the inner, so that by differential elastic recovery at the indented regions, the wall of the inner component is urged forcibly into contact with that of the outer component. Desirably the components are of steel. The outer component can be of a lower grade or lower carbon steel than the inner component.

Preferably the lubricant is or comprises a solid lubricant compound. Known solid lubricants can be used, preferably inorganic compounds, such as molybdenum disulphide, graphite, boron nitride (h-BN), tungsten disulphide or the like. A typical feature of solid lubricants is to adhere relatively fixedly to one of the two metal surfaces and subsequently withstand high loads between them without displacement. A further feature available with appropriately selected solid lubricants is that they can withstand high operating temperatures, especially in generally static situations such as in a connected fixed joint. This is important in relation to components which undergo welding near to the connected joint, since such welding is liable to degrade conventional lubricants such as soap/oil-based greases. A grease or grease-type composition, paste or other fluid format may however conveniently be used as a carrier for the application of a solid lubricant. The solid lubricant can remain in place and serve its function even after other components of the lubricant composition might have dispersed or been degraded. Such compositions are also available in sprayable formats and these may conveniently be used. The method of application of the lubricant may be chosen depending e.g. on its type, consistency and adhesiveness (or that of a carrier composition) and on the material, size, shape etc of the component surface or surfaces to which it is to be applied. Brushing and spraying are often suitable methods.

A molybdenum disulphide-containing lubricant composition is particularly preferred for the present invention. A lubricant able to maintain a film under static load conditions at temperatures of at least 700° C. or at least 800° C. is preferable. In practice a temperature of 400° C. or more may arise at the connection region, and needs to be withstood by the lubricant without the lubricant losing its ability to counter fretting.

The concept underlying the invention arises from research by the present inventors in relation to heavy-duty connected axle-beam joints produced as described in the prior art documents mentioned above. These connections have generally been found to have good performance and satisfactory durability, but we have looked for possible improvements. On examining sample connections of the prior art type, we occasionally found traces of fretting between the inner and outer components at the contacting regions of the depressions. This would not have been expected, since the components appear fully fixed, but investigation revealed some regions of wear of the type associated with fretting, that is to say repeated relative motion of the contacting surfaces albeit at a tiny magnitude. There is of course an initial forcible frictional movement of the components relative to one another during the actual indentation process (crimping or swaging). The proposed use of lubricant is found to reduce both the absolute level and the range of variation of such friction, relative to the known method without lubricant. It can also be envisaged that during use of the connected components, such as in the suspension system of a heavy-duty vehicle, they are subject to forcible vibrations creating tiny but forceful repeated movements which could cause fretting-type damage. Since fretting can ultimately be associated with corrosion and fracture initiation, again the reliable lifetime and fatigue resistance of such a connected component can be improved by considerably reducing any such fretting. By trials we have found that this is indeed achieved by our introduction of lubricant between the components at the connection region.

Thus, in a preferred aspect of our proposals, a method of connecting a vehicle component to a tubular vehicle axle comprises fitting a connector sleeve onto or around the axle, with solid lubricant interposed between the connector sleeve and axle at a connection region, and subjecting the assembly to a crimping operation in which plural depressions are formed by indentation in the connector sleeve and the wall of the tubular axle at the connection region to fix the connector sleeve on the tubular axle. The further vehicle component, such as a suspension component, brake assembly or axle spindle, is connected to the connector sleeve, preferably after the connector sleeve is crimped onto the axle tube, and preferably by means including or consisting of welding. Alternatively the further vehicle component may be connected to the connector sleeve before the latter is crimped onto the axle tube, or may be formed integrally with the connector sleeve. The sleeve may be a full sleeve or a part-sleeve that does not entirely surround the axle.

An axle tube assembly, comprising the crimped-on connector sleeve with the lubricant present between the connector sleeve and axle tube at the connection region, is a further aspect. Another aspect is an axle assembly additionally comprising a further vehicle component such as a suspension component, e.g. as mentioned above, connected to the axle through or by the connector sleeve. Preferably the mechanical connection between the connector sleeve and axle tube is only by the inter-engagement at the depressions.

Desirably the crimping process, in addition to forming the depressions, generally swages or reduces the dimensions of the outer component (sleeve) so that there is a generally close contact of the inner surface thereof against the outer surface of the inner component (axle tube). Usually the components have a loose fit before the crimping, for ease of pre-assembly and especially in the presence of the lubricant. Conversely a close fit after crimping helps to keep water and other fluids out of the interface where the lubricant is, so that the lubricant can remain substantially in place even when liquids are present in the environment, such as during painting processes or in other wet conditions, without being contaminated or washed out. In practice the crimping of the sleeve is itself is often sufficient and effective to provide such water-tightness between the outer and inner components.

If wished, a seal element may be provided acting between the outer and inner components to form a boundary to retain the lubricant at the connection region where its effect is needed, and/or to keep contaminants or water out of the connection region. Such a seal may be provided by applying a sealant composition to the components after they are assembled together, either before or after creation of the depressions, typically at/along an edge of the outer component or sleeve overlying the inner component. This can help to maintain a presence of lubricant close to the edge regions where fretting due to edge contact with the inner component is otherwise a possibility. Additionally or alternatively, one or both of the inner and outer components may have a retaining formation e.g. a lip or bead or the like formation to inhibit escape of the lubricant composition from the connection region when the components are fitted together.

A further option is that an edge of the outer component or sleeve that overlies an outward surface of the inner component (and especially where that outward surface of the inner component extends out beyond that edge), has an inwardly-directed edge surface portion that is angled away from the outward surface, e.g. as a chamfer or enlarged radius of the inward edge of the outer component, to provide some clearance, such as radial clearance, between the inner and outer component surfaces in the fixed or crimped condition. This reduces the potential for fretting engagement that might arise with a normal right-angled edge.

Such a clearance may also constitute a covered groove extending along the edge where a seal or sealant, such as suggested above, may conveniently be positioned. The overhang of the outer component edge can help to position the seal/sealant and protect it during subsequent use of the components e.g. on a vehicle.

Further aspects of our proposals are set out in the claims.

BRIEF DESCRIPTION OF THE DRAWINGS

An example of the invention is now described, with reference to the accompanying drawings in which.

DETAILED DESCRIPTION OF EMBODIMENTS

Figure 1:
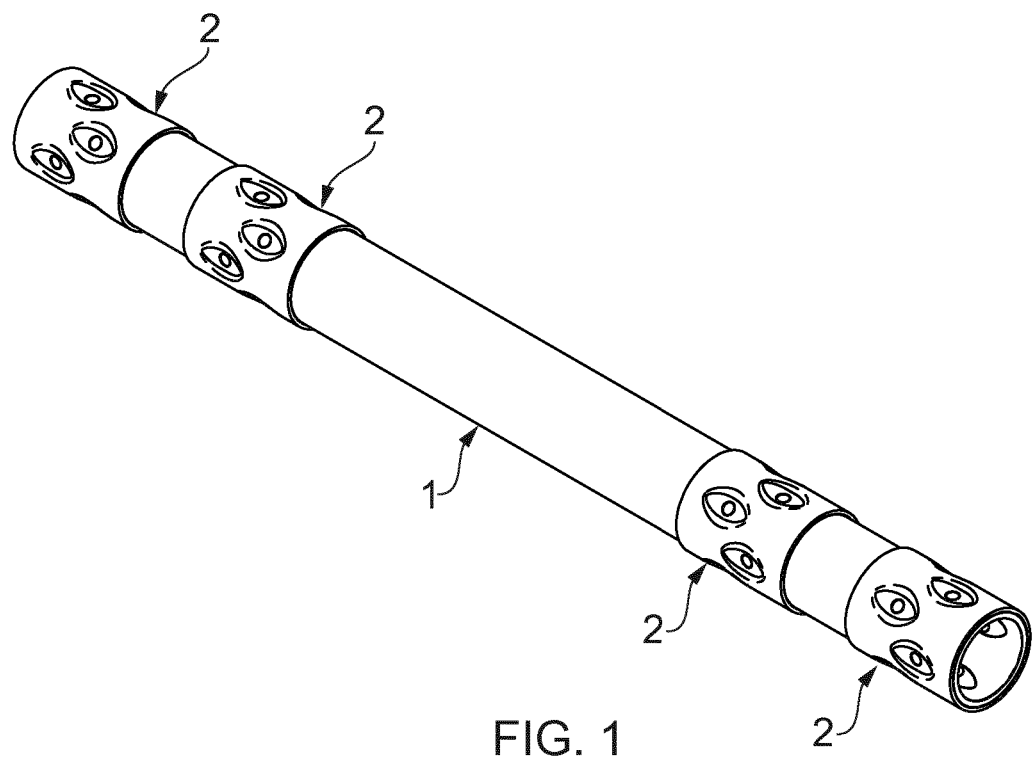
FIG. 1 is a perspective view of a heavy-duty vehicle axle (truck axle) fitted with connector sleeves in accordance with our proposals.

FIG. 1 shows a tubular steel truck axle 1 fitted with four connector sleeves 2. The connector sleeves 2 at the extreme ends of the axle tube 1 are for connection of axle spindles (not shown). Spaced in from the ends of the tube are two further connector sleeves 2 which are for welded connection to respective suspension components such as arms, links, springs or beam members through which the axle is to be connected to the vehicle frame, usually through pivots at frame hangers or the like, to constitute a suspension system. These general features of a heavy-duty suspension assembly and suspension system are well known.

The axle tube 1 and connector sleeves 2 in these embodiments constitute embodiments of the inner and outer components in the general terminology of the present disclosure.

Figure 2:
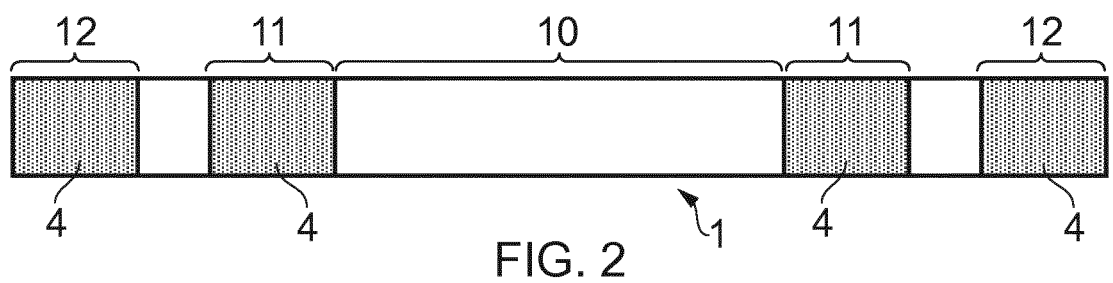
FIG. 2 shows the axle tube before fitting the sleeves.

FIG. 2 shows the axle tube 1 before fitting of the sleeves, and indicates the connection regions, specifically first and second spindle connection regions 12 at the ends of a tube and first and second beam connection regions 11 spaced inwardly therefrom. A longer central region 10 of the axle extends between these.

FIG. 2 shows (by shading) a lubricant composition 4, in the form of an anti-fretting paste containing a molybdenum disulphide solid lubricant, applied to the axle tube outer surface 101 at the connection regions 11,12. The outer tube surface may be prepared for cleanliness and good adhesion, especially freedom from small particles which might be abrasive e.g. by shot blasting, cleaning and the like. Lubricant paste may be applied by brushing, or lubricant may be applied by spray in a more fluid formulation. These lubricant types offer very low friction with high pressure resistance and high temperature resistance, up to about 800° C. The skilled person will be aware of other molybdenum disulphide-containing compositions, and of other types of solid lubricant compositions which may be used instead.

Figure 3:
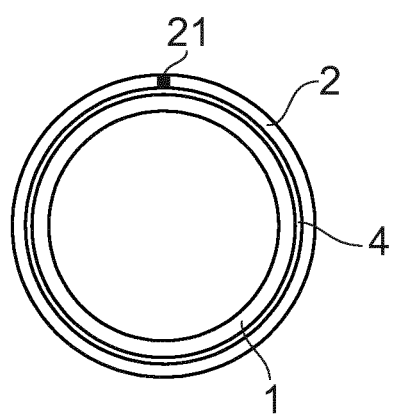
FIGS. 3 and 4 are end views of the axle fitted with a sleeve, respectively before and after a crimping operation.

The steel connector sleeves 2 are fitted at the connection regions 11,12 by a crimping process, generally as described in WO2012/044802. The sleeve is fitted around the axle tube, with a slight radial clearance so that the applied lubricant is not significantly displaced. In typical examples the axle tube 1 might be from 100-150 mm in external diameter, and from 5-10 mm in wall thickness. The connector sleeves 2 might be e.g. from 5-10 mm in thickness. An initial fitting clearance between the ID of the sleeve and the OD of the tube may be e.g. from 1-5 mm radially i.e. considered at a concentric situation. The connector sleeves may be continuous sleeves or welded sleeves; a weld seam 21 is indicated in FIG. 3.

Figure 4:
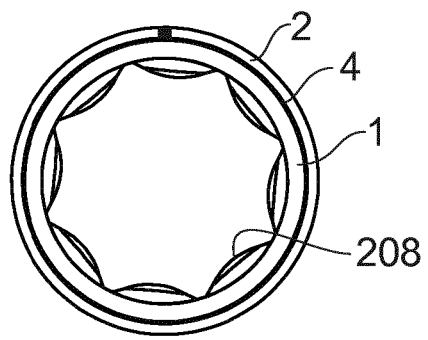

As described in WO2012/044802 this pre-assembly is subject to a crimping and swaging process in an appropriate apparatus with a die set selected to indent the component walls and produce an array of circumferentially- and longitudinally-localised indentations or depressions around the axle tube assembly at each sleeve, as shown in FIG. 1. FIG. 4 shows, by an end view, the substantial indentation of the walls of both components, and the elimination of the initial clearance between the components by the swaging effect.

Figure 6:
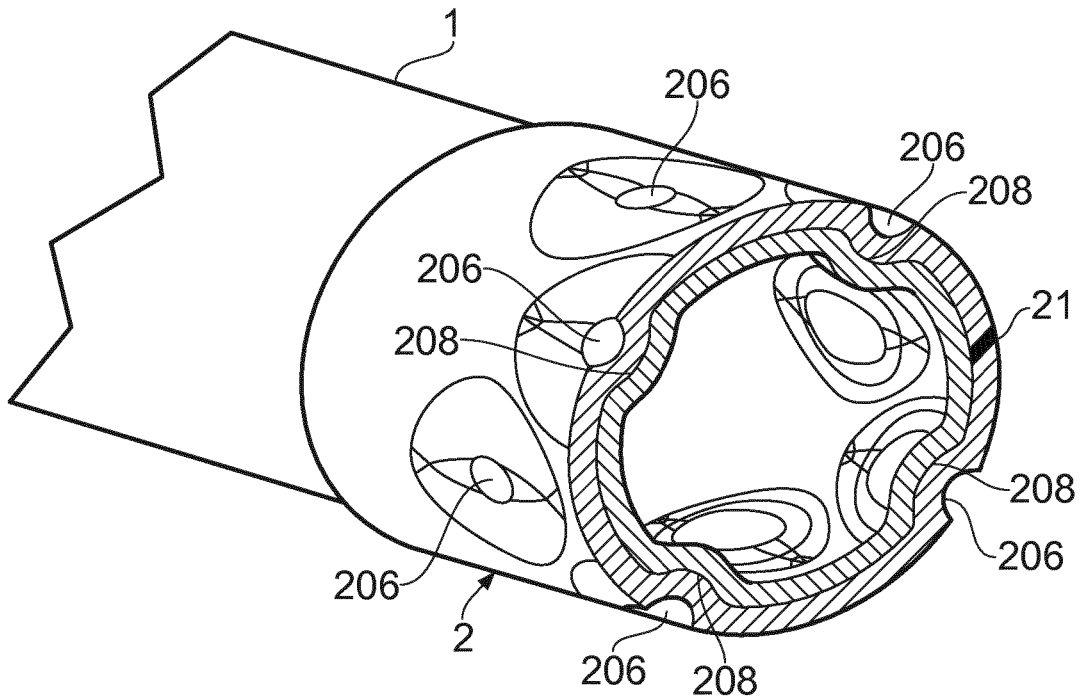
FIG. 6 is an enlarged view of a similar cross-section at a connection region.

During this deformation the anti-fretting paste 4 operates to reduce friction and potential fretting between the inner and outer components during the crimping operation. The material of the sleeves 2 is a lower carbon steel than the axle tube 1 and undergoes more plastic deformation during the crimping operation, so that after the elastic recovery of the components, the concave outer surfaces of the axle tube depressions 208 are urged forcibly outwardly into contact with the convex inner surfaces of the respective sleeve depressions 206 (see FIG. 6), creating an entirely rigid connection between the sleeve 2 and the tube 1. The illustrated embodiment has eight depressions distributed around the tube. The number is not strictly limited and may be e.g. from 2 to 10, and can be selected in accordance with the size and shape of the components to provide the necessary degree of security.

Figure 5:
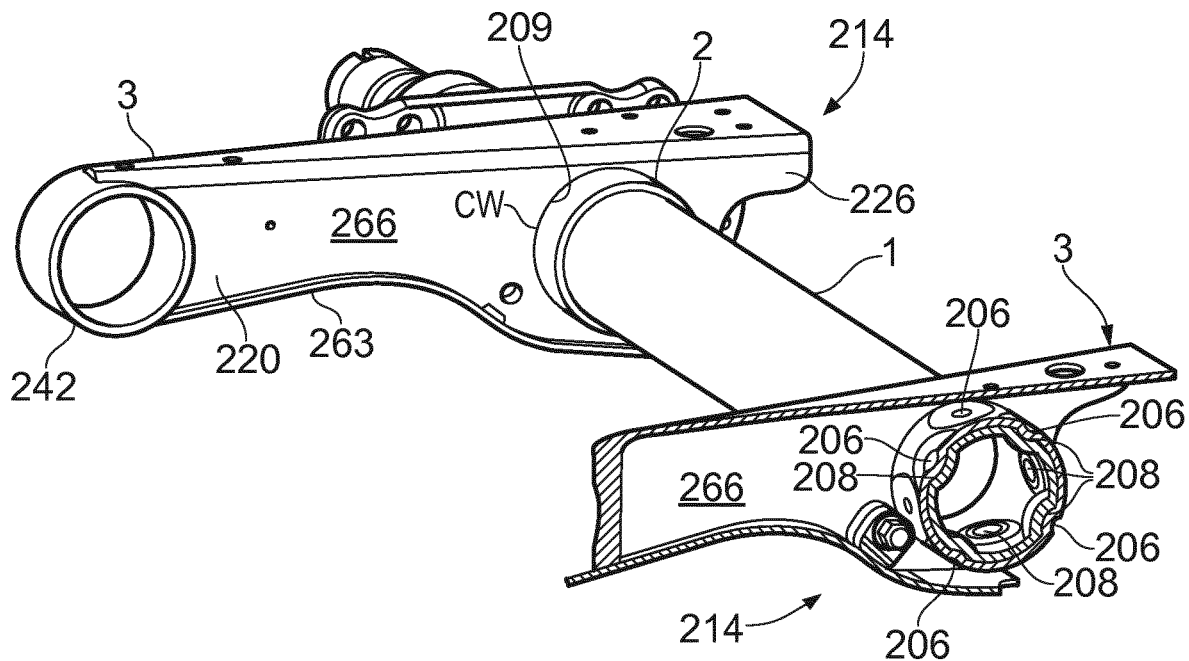
FIG. 5 is a perspective view showing part of a heavy-duty vehicle (truck) suspension assembly incorporating an axle embodying our proposals, and showing a transverse cross-section at a connection region.

FIG. 5 shows how the axle tube 1 fitted with the connector sleeves 2 is connected to a suspension component, in this case a trailing arm beam 3, to form a suspension assembly 214 at one side of a suspension system. In this embodiment the beam 3 constitutes the "further component", in the general terminology used herein.

The illustrated beam 3 has a hollow fabricated form. A channel-form member constitutes the top and side walls 266 of the beam, and a bottom plate 263 welded along the bottom edges of the side walls 266 completes the structure. The beam has a front end 220 with a bushing tube 242 for a pivot connection to the frame, and a rear end 226 projecting behind the axle location and where an air spring may be mounted. The two side walls 266 have aligned circular openings 209 sized and spaced to receive a single connector sleeve 2 of the axle assembly. The assembly is completed by forming circular welds CW around the opening between the sleeve 2 and each side wall 266 of the beam 3. The convenience of a welded-only connection is achieved but without welding directly onto the axle. By avoiding welding directly to the axle, local stress risers can be avoided or reduced and durability and lifetime enhanced. Moreover the selected solid lubricant in the connection regions between sleeve and axle can withstand the conditions at that location during the nearby welding, which typically might rise to about 500° C.

Since a film of the lubricant is then maintained between the contacting surfaces of the axle tube 1 and sleeve 2, fretting and corrosion are inhibited at these areas even under conditions of use including vibration, and an improvement in average lifetime can be expected. The crimped contact is sufficiently tight and uniform over the joint to keep out water and protect the lubricated area in general operation.

Figure 7:
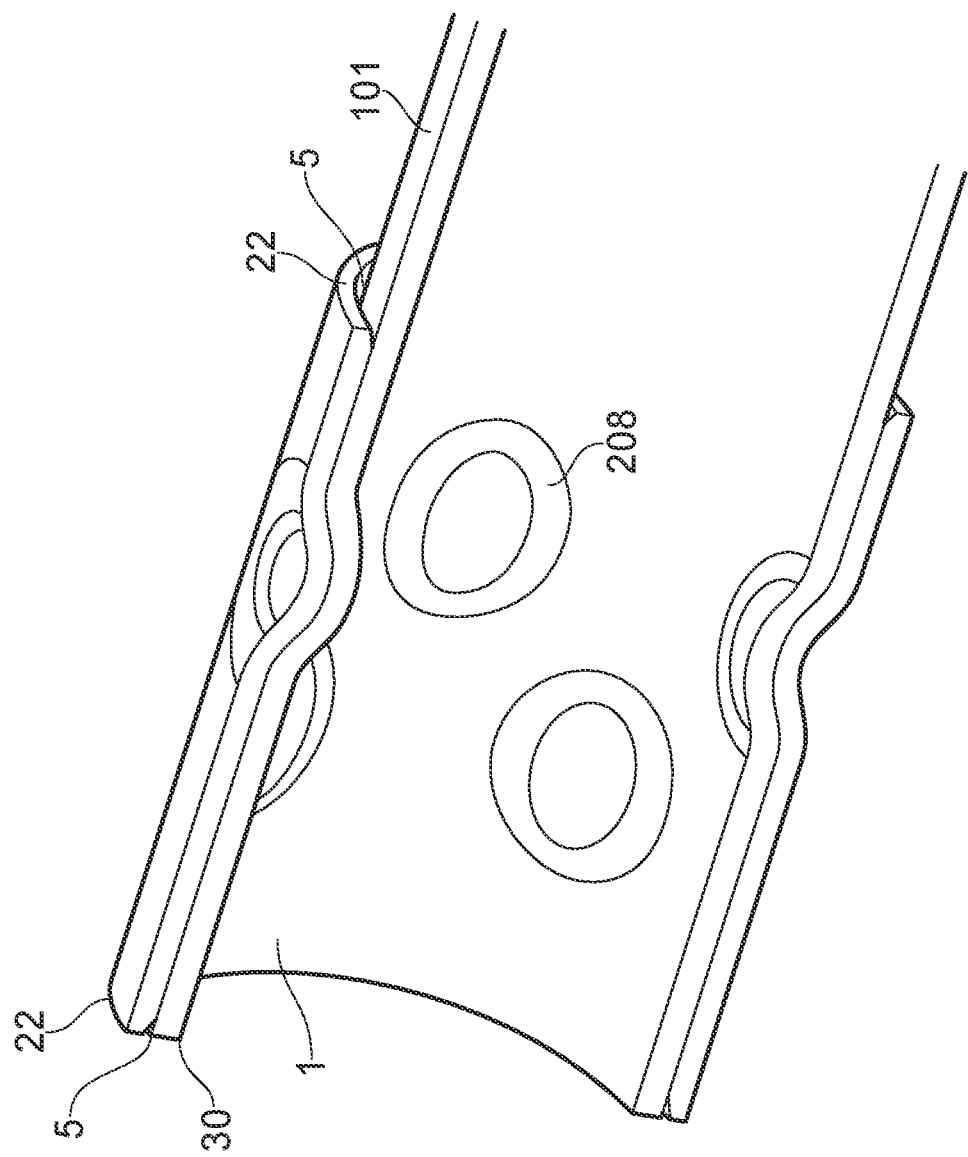
FIG. 7 is a longitudinal axial cross-section at a connection region, showing edge shaping of the connector sleeve.

FIG. 7 shows a preferred structure at the edges 22 of the connector sleeve 2. Here one sleeve edge 22 overlies a corresponding edge 30 at the end of the axle tube 1, the other sleeve edge 22 overlies the outer surface 101 of the axle tube which extends out beyond the sleeve 2. At each edge 22 the original "square" inner edge corner has been machined back as an enlarged radius or chamfer, forming an inwardly-directed edge surface portion 23 angled and spaced away from the outer axle surface 101 and defining a convergent groove 5 between them. The extremity of the sleeve 2, which might tend to make frictional or fretting engagements with the axle surface 101 during deformation under load, then presents a rounded and gently angled surface to minimize such potential for frictional damage.

Figure 8:
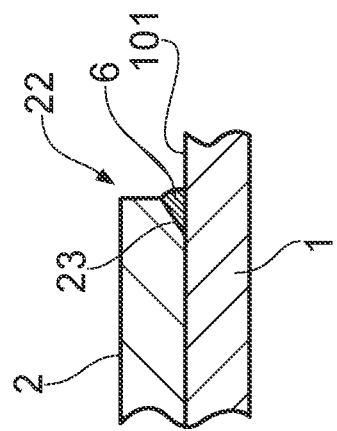
FIG. 8 shows detail of a seal at the connector sleeve edge.

Additionally, the groove 5 can be used to help form a precautionary outer seal around the lubricant-containing connection region. FIG. 8 shows, in a fragmentary cross-sectional view, how a sealant such as a polyurethane or silicone sealant can be applied all around the edge 22 in the groove 5 to form a seal bead 6. The overhang of the sleeve edge 22, over the groove 5, helps to protect the seal bead 6 against damage during subsequent use of the axle.

It will be understood that not only suspension beams but other kinds of further component, such as a brake system element or axle spindle, can be secured to the axle in an analogous way.

The invention claimed is:

1. A method of connecting an inner metal component, which is a tubular vehicle axle or suspension crossbrace having a wall with an outer connection surface, to an outer metal component, which comprises a tube or part-tube which fits around or onto the outer connection surface of the inner component and has a wall with an outer connection surface to complement the outer connection surface of the inner component, the method comprising:
    fitting the inner and outer components together with said walls complementing;
        wherein an edge of the outer component overlies the outward surface of the inner component and has an inwardly-directed edge surface portion that is angled and spaced away from the outward surface of the inner component to define an open convergent groove therebetween;
    forming one or more depressions in both said walls by indentation, providing a mating engagement between the inner and outer components at the aligned depressions thereof, to connect them together by mechanical interlock;
    providing a solid lubricant between the inner and outer components at a connection region where the one or more depressions are formed, so that the lubricant is present between the indented wall portions of the components; and
    providing a seal along the open convergent groove, thereby forming a boundary to retain the lubricant at the connection region and/or to keep contaminants out of the connection region.

2. The method of claim 1 in which the solid lubricant is selected from the group consisting of molybdenum disulphide, graphite, boron nitride (hBN), and tungsten disulphide.

3. The method of claim 1 in which the lubricant is applied preliminarily to the connection region in a fluid form or carrier, selected from the group consisting of a paste, grease, and spray, and is applied to the outer surface of the inner component, or to the inner surface of the outer component at the connection region, or to both said surfaces.

4. The method of claim 1 in which plural said depressions are formed in an array distributed around the inner and outer components.

5. The method of claim 1 wherein the one or more depressions are inwardly directed, so that the outer surface of the outer component is indented and the inner surface of the inner component-projects inwardly.

6. The method of claim 1 further comprising subsequently attaching a further component to the outer component.

7. A connected assembly comprising an inner component and an outer component connected thereto, the assembly obtained or obtainable by the method of claim 1, and having said one or more depressions and the lubricant present at the interface between the inner and outer components at said one or more depressions.

8. The method of claim 6 wherein the method of subsequently attaching the further component to the outer component comprises welding.

9. The method of claim 1 wherein the inwardly-directed edge surface portion is angled away from the outward surface of the inner component as a chamfer or radius.

10. A method of connecting a vehicle component to a tubular vehicle axle, comprising:
    fitting a connector sleeve onto or around said axle, and providing solid lubricant interposed between the connector sleeve and axle at a connection region;
        wherein an edge of the connector sleeve overlies the outward surface of the axle and has an inwardly-directed edge surface portion that is angled and spaced away from the outward surface of the axle to define a convergent groove therebetween;
    subjecting the resulting assembly to a crimping operation to form plural depressions in the connector sleeve and in the wall of the axle at the connection region, to fix the connector sleeve on the tubular axle; and
    providing a seal along the open convergent groove of the connector sleeve, thereby forming a boundary to retain the lubricant at the connection region and/or to keep contaminants out of the connection region.

11. The method of claim 10 further comprising attaching a further vehicle component selected from the group consisting of a suspension component, a brake assembly, and an axle spindle, to the connector sleeve by means comprising welding.

12. An axle assembly obtainable by the method of claim 10, comprising the axle, the crimped-on connector sleeve with the solid lubricant present between the connector sleeve and axle at the connection region.

13. The assembly of claim 12 further comprising a suspension beam attached to the connector sleeve by welding.

14. The assembly of claim 12 in which the solid lubricant further comprises molybdenum disulphide.

* * * * *